Nov. 1, 1932.  W. H. SMYTH  1,885,485

CONVERTIBLE NOISELESS TRACKLAYER TRACTOR

Filed July 9, 1928  3 Sheets-Sheet 1

INVENTOR
William H. Smyth

Nov. 1, 1932. W. H. SMYTH 1,885,485
CONVERTIBLE NOISELESS TRACKLAYER TRACTOR
Filed July 9, 1928    3 Sheets-Sheet 2

INVENTOR
William H. Smyth

Nov. 1, 1932.  W. H. SMYTH  1,885,485
CONVERTIBLE NOISELESS TRACKLAYER TRACTOR
Filed July 9, 1928   3 Sheets-Sheet 3
Fig. 5.
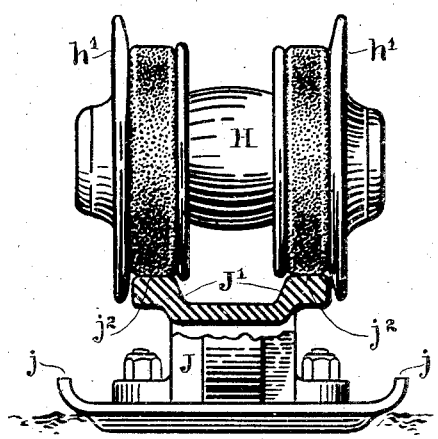
Fig. 6.
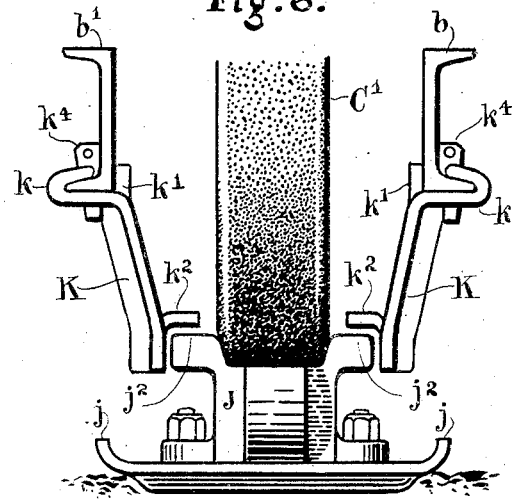
Fig. 7.
Fig. 8.
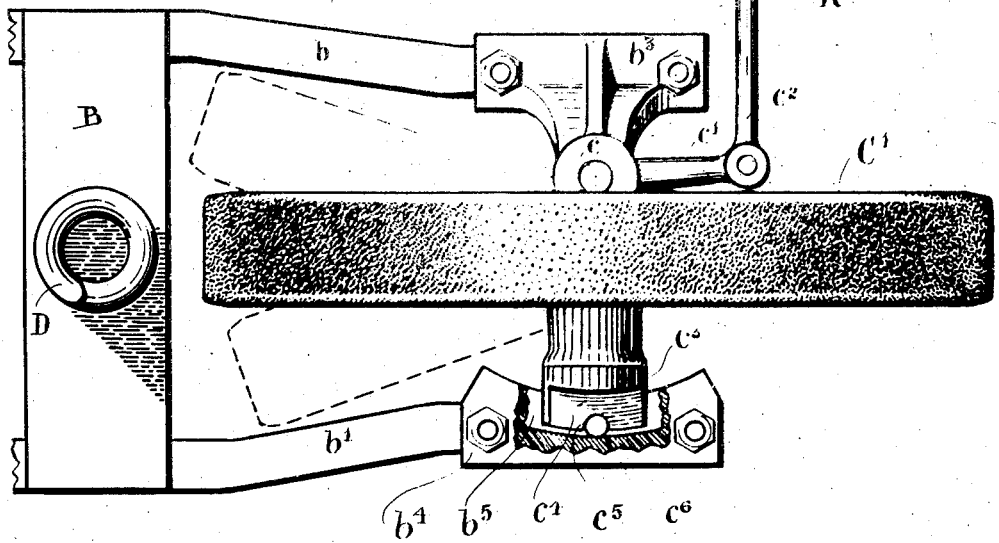
INVENTOR
William H. Smyth Patented Nov. 1, 1932

1,885,485

UNITED STATES PATENT OFFICE

WILLIAM H. SMYTH, OF BERKELEY, CALIFORNIA

CONVERTIBLE NOISELESS TRACKLAYER TRACTOR

Application filed July 9, 1928. Serial No. 291,361.

My invention relates to motor and other vehicles. It has for its object to combine in a noiseless vehicle the functional advantages of the tracklayer and roundwheel types.

While the tracklayer assembly alone broadly distinguishes the self-laying-track type from the "roundwheeler" form of vehicle the two types have widely different functions to perform and operate under very dissimilar conditions. The tracklayer tractor characteristically, is slow moving; it is intended to operate on unprepared and naturally rough and uneven ground; its main function is to overcome great resistance at slow speed. The Roundwheel vehicle characteristically, is fast moving; it is intended to operate on prepared roadways which are normally smooth and free from obstruction; its main function is to overcome comparatively light resistance at high speed.

A motor-vehicle intended to overcome large resistance at slow speed on unprepared ground needs great power and large tractive ground abutment contact; hence the sprocket-wheel driven endless track-chain with its load-supporting tread-plates and their anchoring caulks. Present accepted practice in these matters, renders the tracklayer-tractor operatively incalculable and ineconomical on ordinary unprepared land; incalculable, because hummocks and hollows constantly vary the wheel-base length and draw-bar pull; and ineconomical, because a costly motor element must be provided of power commensurate with full length wheel-base maximum draw-bar pull of level land tractive contact.

In a convertible machine the diverse functional characteristics and operative requirements peculiar to each type must be provided for in such wise that the constructive features intended for operation in one form shall not interfere with the functional requirements and constructive necessities of the other. In general, the object of the present invention is a combination machine of this character that will remedy the stated undesirable tracklayer features and function effectively under the tracklayer and "roundwheeler" conditions of operation; to provide "roundwheeler" running gear adapted to high speed road service combined with effective tracklayer means applicable to standard makes of tractors.

More specifically, another object of the invention is to provide in this character of device, a traction-assembly such that the load-bearing wheel-base remains of constant and of maximum effective length, regardless of varying surface contour and hence of full and predictable draw-bar pulling power on unprepared ground surfaces; and that the tracklayer load-bearing wheel-base shall be of the same length as that of the device when operating as a "roundwheeler". It aims to provide such means that, both as a tracklayer or as a "roundwheeler", the device shall be practically noiseless in operation and so simple in construction that conversion from tracklayer into "roundwheeler" or the reverse can be quickly effected without the use of special tools or appliances, during ordinary commercial use in the field or on the road.

A typical expression of my invention which accomplishes these objects, is shown in the accompanying drawings wherein:

Fig. 5 is an end view of a wide or three-track chain link and rollers thereon. A portion is broken away for better illustration.

Fig. 6 is an end view of a track-chain link showing a cushion-tire support-wheel thereon and track-chain guards to prevent track-chain torsion and lateral displacement.

Fig. 7 is a front view of a modified form of track-chain guard;

Fig. 8 is a plan view of the front end of the traction-assembly frame B, with provision for front-wheel steering when functioning as a "roundwheeler".

Figure 1:
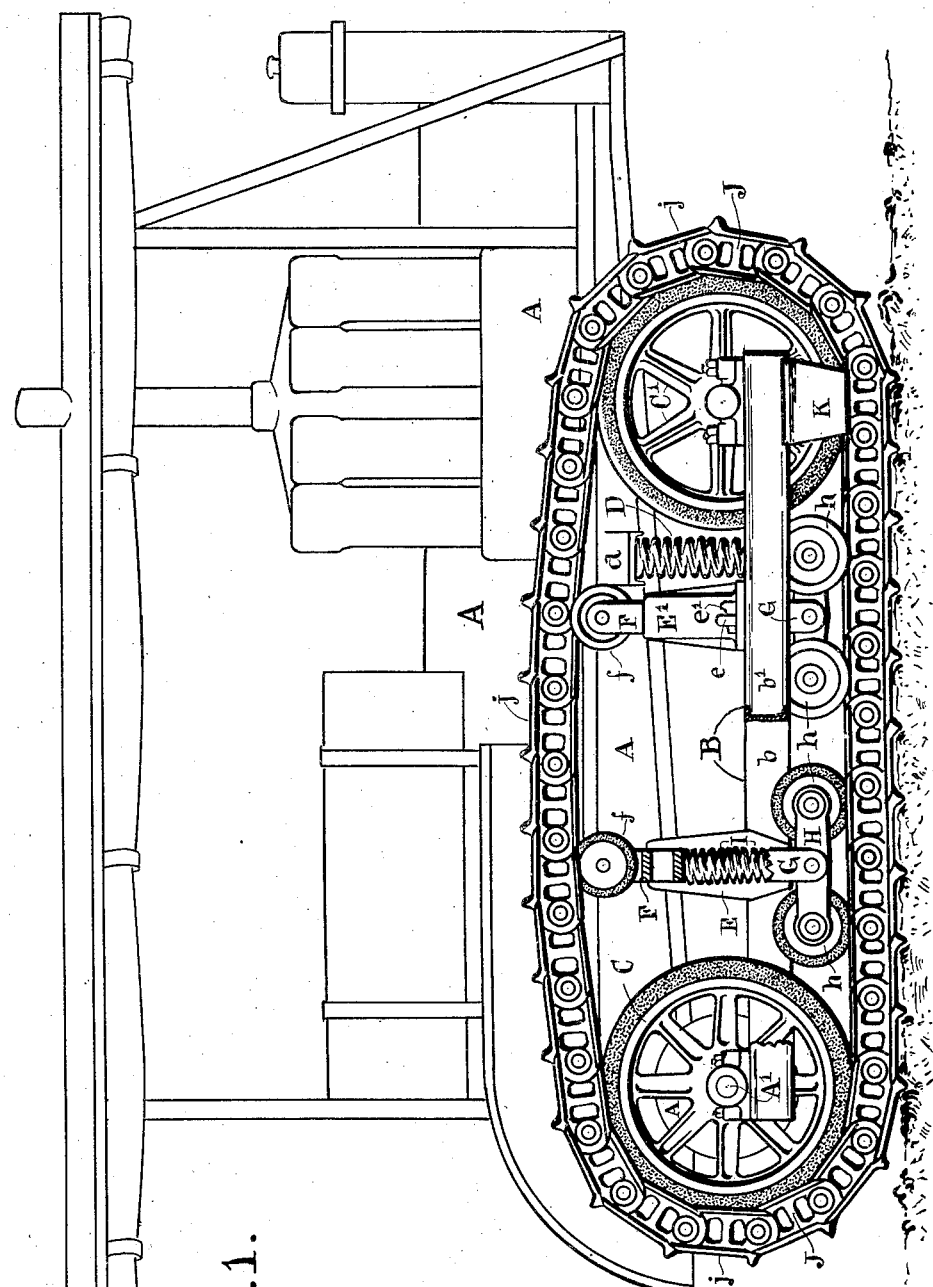
Fig. 1 is a side elevation of the device with the endless track-chain and the tracklayer appurtenances in position, portions being broken away for better illustration.

As the traction-assembly alone broadly distinguishes the self-laying-track type from the "roundwheeler" form of vehicle and the power element with either rear- or front-wheel steering, being within the knowledge of mechanics skilled in this art, and both sides substantially alike, I will confine my description to one side and to those parts directly affected by my invention. The motor-means being of customary design and not essentially involved, I have indicated it by outline as more detailed delineation would tend to obscure rather than to clarify the real subject matter of this disclosure.

With this understanding, and referring to the drawings: A, represents the power element of the tractor having a transverse power shaft $A^1$. B, represents traction-assembly frame shown herein as consisting of beams $b$, $b^1$, preferably hinged near the rear end upon or adjacent to the power shaft $A^1$, for free arc movement. Upon the power shaft $A^1$, is secured a supporting and driving wheel C, adapted to ordinary locomotion on normal road surface, shown in Figs. 1, and 4, as cushion-tire road-wheels. Near the opposite end of the frame B, is journaled a second support-wheel $C^1$, substantially similar to C, and spaced apart therefrom to constitute a two-point-support wheel-base for the frame B. Adjacent to the wheel $C^1$, is provided a strong spring D, resting upon the frame B, its upper end abutting a support member $a$, to resiliently support the front end of the motor element.

Detachably secured to frame B, and located intermediate of the wheels C, $C^1$, are vertical guide members E, $E^1$. To attach the guides, studs $e$, $e$, are provided secured to the frame B, and passing up through the base of the guides E, $E^1$. These studs are locked in place by keys $e^1$. Slidable in the upper part of each of the guides is a vertically movable slide-block F. Journaled in the upper end of each slide-block, is a flanged, cushion-tire chain-support roller $f$. Slidable in the lower part of each of the guides is another vertically movable slide-block G; at the lower end of slide-block G, is pivoted a rock-arm H; and journaled at each end of this rock-arm is a flanged, cushion-tire track-roller $h$. Between and abutting against the slide-blocks F, and G, is a spring I. Trained around the support wheels C, $C^1$, and tangentially contacting with the peripheries of rollers $f$ and $h$, is an endless hinged track-chain J. The inner or track surface of the chain is transversely concaved to constitute a guide-way or channel $J^1$, conforming to the transverse section of the rim of support-wheels C, $C^1$, as shown in Fig. 6. On the outer or ground side of the track-chain J, are laterally projecting tread-plates or shoes $j$, of customary form.

Detachably secured to the side members of frame B, may be provided track-guards K, extending from the lower portion of the frame to below the track surface of the track-chains J, forming a vertical and horizontal guard for the track on each side thereof, as shown in Figs. 1, 6, and 7. Each track-guard K, is shown as a longitudinally disposed plate with upper hook-shaped edge $k$, and an abutment $k^1$, forming between the hook and the abutment a recess or channel adapted to slide endwise over the lower flange of each of the frame members $b$ and $b^1$. Each track-guard K, extends downward to form a vertical flange $K^1$, below the track surface $j^2$, as shown in Fig. 1, and closely adjacent to the outside of the track as shown in Fig. 6. From each of the guards K, inwardly extends a horizontal flange $k^2$, slightly above and over the surface $j^2$, of the track. A securing wedge key $k^4$, passes vertically through the hook-shaped edge $k$, of guard K, and through the lower flange of the member-beam of frame B, to which guard K, is attached. In the modification illustrated in Fig. 7, a flanged-roller $k^5$, is substituted for the horizontal flange $k^3$, and vertical flange $k^2$.

Figure 4:
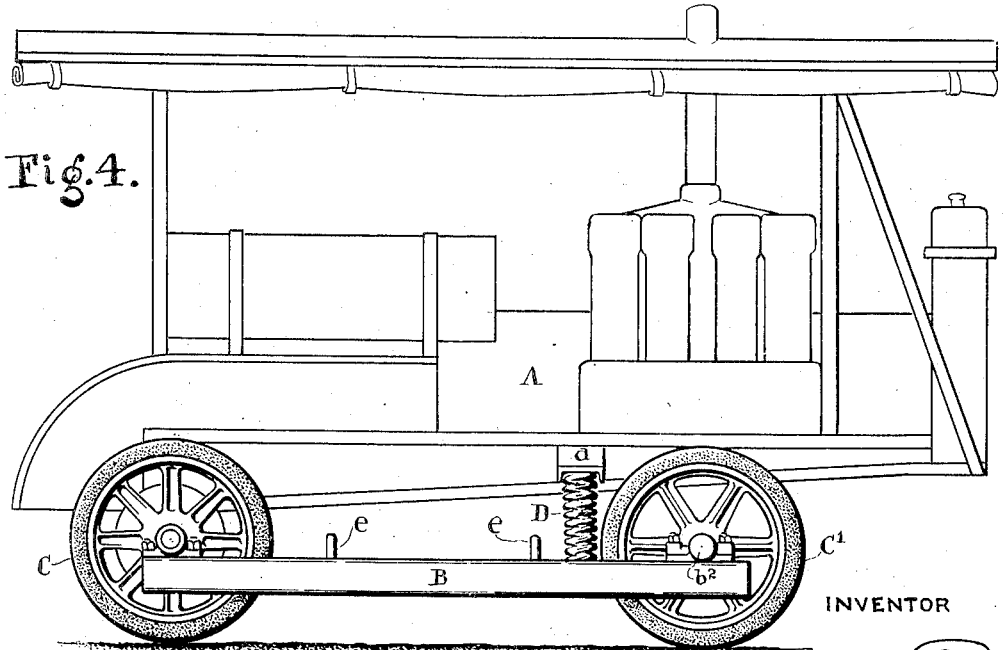
Fig. 4 is a similar view to Fig. 1, with the tracklayer appurtenances removed, and the device transformed into a "roundwheeler"

In Figs. 1, and 4, the front support-wheel $C^1$, is shown journaled in a bearing $b^2$. In Fig. 8, an alternative mounting of the support-wheel $C^1$, is illustrated; in this figure the wheel $C^1$, is journaled on an axle radially attached to a vertical pivot $c$, in a bracket $b^3$, secured upon the frame member $b$. Extending radially from the pivoted member $c$, is an arm $c^1$, to the end of which arm is flexibly secured a link $c^2$, suitable to connect with the steering mechanism of the motor element for front-wheel steering. At the outer end of the axle upon which $C^1$, rotates is a slide-block $c^3$, provided with slide surface $c^4$. Upon the frame member $b^1$, is secured a guide $b^4$, with arc-shaped channel $b^5$, for arc-movement of slide-block $c^3$, and in the slide-block $c^3$, is a lock-notch $c^5$. A locking pin $c^6$, is provided to secure the wheel $C^1$ in the same vertical plane as the rear support-wheel C.

In Fig. 1, the cushion-tire track rollers $h$—$h$ of the rearward guide E, travel in the track-channel $J^1$, with their flanges outward of the raised edges of the track-chain J, as shown in the same figure in connection with guide member $E^1$. In Fig. 5, is shown track-wheels $h^1$—$h^1$ resting upon the raised sides $j^2$ of track-way or channel $J^1$ constituting a three-track track-chain, the three tracks consisting of elevated side tracks $j^2$ and the intermediate depressed track-way $J^1$.

From the preceding description of the various details it will be seen that to transform the machine from a tracklayer into a "round-wheeler", it is only necessary to uncouple the track-chain at one of its hinges and stretch the track-chain on the ground, then knock out the key wedges $e^1$—$e^1$, and remove the guides E, $E^1$, from off their studs $e$—$e$ together with their associated rollers $f$—$f$, and $h$—$h$. Then knock out the wedge-key $k^4$—$k^4$ and slide the track-guards K—K off their respective frame beams and the machine will then be stripped of its tracklayer appurtenances and ready to roll off the chain-track on to the ground or road for round-wheel road service. All this is the work of a few minutes and requires neither skill nor special tools to accomplish. To retransform into a tracklayer is equally simple, being namely reversing the described operation. If the machine be constructed as shown in Fig. 3, the removal of locking-pin $c^6$, is all that is necessary to permit front wheel steering.

Figure 2:
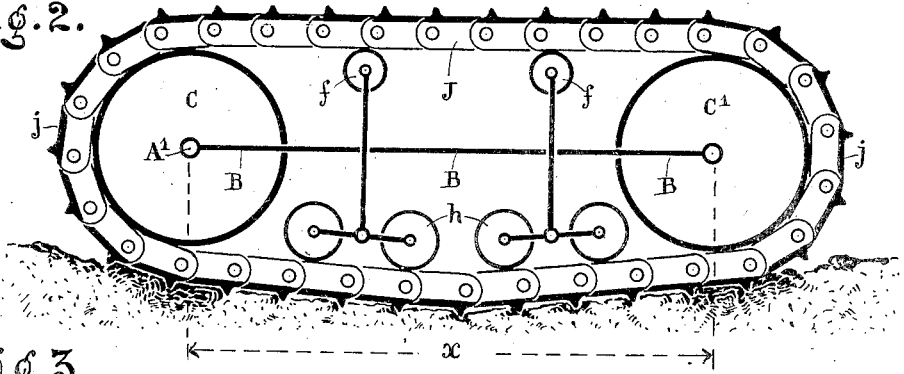
Fig. 2 is a diagram of the tracklayer track-chain and track-rollers conforming to ground contour over the whole length of wheel-base $x$, when traversing a ground depression or swale.
Figure 3:
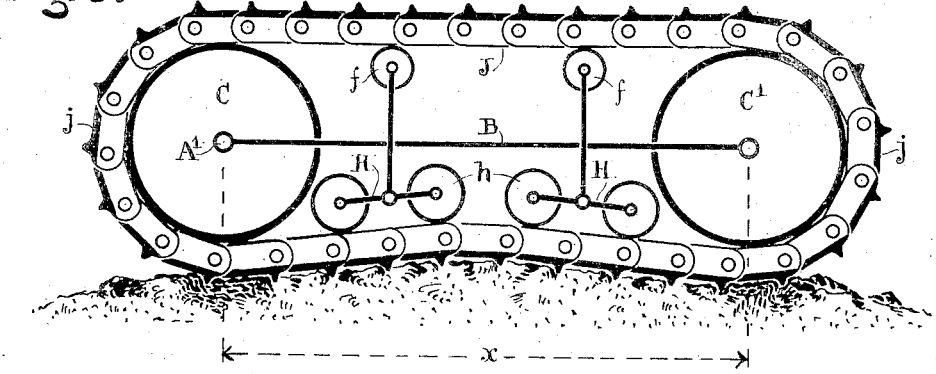
Fig. 3 is a similar diagram to Fig. 2, showing the track-chain and track-rollers conforming to the ground contour over the whole length of the wheel-base $x$, under the opposite contour conditions of passing over a ground elevation or hummock.

The track-wheels $h$—$h$, merely serve to keep the track-chain in tractive contact with the ground in its varying contour; the entire load of the machine, both as tracklayer and "roundwheeler", is upon the support-wheels C, and $C^1$, as shown in Figs. 2, 3, and 4.

The springs I, are of sufficient strength and tension only to embed the shoe-caulks in the ground for anchorage. Besides serving this function, the springs I, resiliently sustain and accommodate the upper-run to the varying requirements of the ground-run, as is indicated in Figs. 1, 2, and 3.

The tension on the upper-run effects the friction grip of the chain upon the semi-circumference of the cushion-tire support-wheels C, $C^1$, constituting a friction clutch of power-transmitting capability equal to or greater than the power of the motor element.

The combined tractor has the same drive-wheels, the same support-wheels and the same length of wheel-base both as a tracklayer and as a "roundwheeler". And, on unprepared ground the effective tracklayer wheel-base, indicated by the dotted lines $x$, remains of constant and of maximum length, and hence of full and predictable draw-bar traction. All of this is shown in Figs. 1, 2, 3, and 4.

The sound-deadening cushion-tire friction drive-wheels, cushion-tire support-wheels, cushion-tire ground-run track-wheels, cushion-tire chain support-rollers, prevent the noise resulting from the customary metal-to-metal sprocket-wheel and cog-chain drive, metal-to-metal load-support truck-wheels and metal-to-metal chain support-rollers.

The track-guard K, located directly below the axis of the front support-wheel $C^1$, relieves the chain from torsional strains at this point of exceptional stress and prevents derailment to which the tracklayer is liable as heretofore constructed.

The cushion-tire and chain friction clutch drive eliminates the destructive effect of the intrusion of rocks and resistant compacting ground material; the unbroken traction surface makes it self cleaning. Being untoothed, both as to driver wheel and chain, lengthening of the chain by wear does not affect its relation to its driver as is the case with a sprocket-wheel and cog-chain, with their fixed pitch relation.

The track-wheels $h$—$h$, being relieved of the load-bearing duty customarily imposed upon them, for which their necessarily small diameter makes them inappropriate, and the transference of this function to the large diameter wheels C, $C^1$, makes it practical to cushion-tire the track-wheels $h$—$h$, and prevent noise, while retaining the track-wheel flange functions of maintaining the operative relation of wheels and chain and preventing lateral track-chain displacement.

In view of these departures from present accepted practice and construction, I do not desire to be limited to the particular expressions of my invention used herein for illustrative purposes, nor limited in any way other than in accord with the liberal interpretation and the reasonable import of the claims which follow.

I claim:

1. In a tractor track assembly, a frame, cushion-tire wheels journaled thereon, an endless laterally inflexible track made up of hinged links trained around the wheels and cushion-tire wheels journaled on the frame adapted to support the upper-run of the track between the peripheries of the first mentioned wheels.

2. In a tractor track assembly, a frame, cushion-tire wheels journaled thereon, an endless laterally inflexible track made up of hinged links trained around the wheels, cushion-tire wheels journaled on the frame adapted to support the upper-run of the track between the peripheries of the first mentioned wheels and cushion-tire wheels travelable upon the ground-run of the track.

3. In a tractor track assembly, a frame, cushion-tire wheels journaled thereon, an endless laterally inflexible track made up of hinged links trained around the wheels, cushion-tire wheels journaled on the frame adapted to support the upper-run of the track between the peripheries of the first mentioned wheels and spring opposed cushion-tire wheels travelable upon the ground run of the track adapted to resiliently control its flexure.

4. In a tractor track assembly, a frame, cushion-tire wheels journaled thereon, an endless track made up of hinged lings trained around the wheels and cushion-tire wheels journaled on the frame adapted to support the upper-run of the track between the peripheries of the first mentioned wheels.

5. In a tractor track assembly, a frame, cushion-tire wheels journaled thereon, an endless track made up of hinged links trained around the wheels, cushion-tire wheels journaled on the frame adapted to support the upper-run of the track between the peripheries of the first mentioned wheels and cushion-tire wheels travelable upon the ground-run of the track.

6. In a tractor track assembly, a frame, cushion-tire wheels journaled thereon, an endless track made up of hinged links trained around the wheels, cushion-tire wheels journaled on the frame adapted to support the upper-run of the track between the peripheries of the first mentioned wheels and spring opposed cushion-tire wheels travelable upon the ground run of the track adapted to resiliently control its flexure.

7. In a track assembly for vehicles, a frame with support-wheels journaled thereon, a track-chain adapted to flexibly conform to uneven ground trained around the wheels in friction-driven circumferential contact, track-rollers travelable upon the ground-run, rollers adapted to support the upper-run, sound-deadening means interposed between the upper-run and the support-rollers, and sound-deadening means interposed between the ground-run and the wheels travelable thereon.

8. In a track assembly for vehicles a frame with support-wheels journaled thereon, a track-chain adapted to flexibly conform to uneven ground trained around the wheels in friction-driven circumferential contact, track-rollers travelable upon the ground-run, rollers adapted to support the upper-run, resilient means interposed between the upper-run and support-rollers, and resilient means interposed between the ground-run and the wheels travelable thereon.

9. A tractor comprising motor means having a transverse power-shaft, a cushion-tire load-supporting drive-wheel on the power-shaft, a cushion-tire support-wheel longitudinally spaced apart from the drive-wheel to constitute therewith a two-point-support, a track-chain adapted to flexibly conform to uneven ground trained around the wheels and cushion-tire track-rollers travelable upon the ground-run between the support-wheels.

10. A tracklayer assembly with cushion-tire wheels journaled thereon, an endless traction chain made up of links suitably hinged to resist lateral flexure trained around the cushion-tire wheels in circumferential contact and cushion-tire rollers intermediate the cushion-tire wheels travelable on the track chain in its ground run.

11. A tracklayer assembly with cushion tire wheels journaled thereon, an endless traction chain made up of links suitably hinged to resist lateral flexure trained around the cushion-tire wheels in circumferential contact and spring opposed cushion-tire rollers intermediate the cushion-tire wheels travelable on the track chain in its ground run.

12. A tracklayer assembly with cushion-tire wheels journaled thereon, an endless traction chain made up of links suitably hinged to resist lateral flexure trained around the cushion-tire wheels in circumferential contact and spring opposed cushion-tire rollers intermediate the cushion-tire wheels adapted to resiliently support the upper run and to resiliently control the flexure of the track chain in its ground run.

13. A traction assembly comprising a power-driven cushion-tire support-wheel with a second cushion-tire wheel longitudinally spaced apart therefrom, an endless track trained around the wheels, cushion tire wheels travelable on the endless track in its ground run and wheels associated with the last mentioned wheels adapted to support the upper run of the track chain intermediate the first mentioned wheels.

14. A track assembly comprising a power-driven cushion-tire support-wheel with a second cushion-tire wheel longitudinally spaced apart therefrom, an endless track trained around the wheels, spring opposed cushion tire wheels travelable on the endless track in its ground run, spring-opposed wheels located above the last mentioned wheels adapted to support and tension the upper run of the track chain intermediate the first mentioned wheels.

15. A traction assembly comprising a power-driven cushion-tire wheel with a second cushion-tire wheel longitudinally spaced apart therefrom, an endless track formed of links hinged to resist lateral flexure trained around the wheels, cushion-tire wheels travelable on the endless track intermediate the first mentioned wheels and spring opposed cushion tire wheels adapted to support the upper run of the chain.

16. In a tracklayer comprising a motor with a power driven shaft transversely thereof, a frame one end of which is pivoted adjacent to the shaft, a cushion tire wheel secured upon the shaft, a cushion tire wheel journaled on the frame adjacent to its free end, an endless traction chain made up of links suitably hinged to resist lateral flexure trained around the cushion-tire wheels in circumferential contact and spring opposed cushion-tire rollers intermediate the cushion-tire wheels adapted to resiliently control the flexure of the track chain in its ground run.

17. In a tracklayer comprising a motor with a power driven shaft transversely thereof, a frame one end of which is pivoted adjacent to the shaft, a cushion tire wheel secured upon the shaft, a cushion tire wheel journaled on the frame adjacent to its free end, an endless traction chain made up of links suitably hinged to resist lateral flexure trained around the cushion-tire wheels in circumferential contact and cushion-tire rollers intermediate the cushion-tire wheels adapted to control the flexure of the track chain in its ground run.

18. A tractor comprising a frame, motor means thereon having a transverse power-shaft journaled on the frame, a cushion-tire load-supporting drive-wheel on the power-shaft, a cushion-tire support-wheel journaled on the frame longitudinally spaced apart from the drive-wheel to constitute therewith a two-point-support, a track-chain adapted to flexibly conform to uneven ground trained around the wheels, cushion-tire rollers travelable upon the ground-run and cushion-tire rollers adapted to support the upper-run.

19. A tractor comprising a frame, motor means thereon having a transverse power-shaft, a cushion-tire load-supporting drive-wheel on the power-shaft, a cushion-tire support-wheel journaled on the frame longitudinally spaced apart from the drive-wheel to constitute therewith a two-point-support, a track-chain adapted to flexibly conform to uneven ground trained around the wheels, cushion-tire track-rollers travelable upon the ground-run, cushion-tire rollers adapted to support the upper-run of the chain and resilient means adapted to tension the track-chain between the drive-wheel and support-wheel.

20. A tractor comprising a frame, motor means thereon having a transverse power-shaft journaled on the frame, a cushion-tire load-supporting drive-wheel on the power-shaft, a cushion-tire support-wheel journaled on the frame longitudinally spaced apart from the drive-wheel to constitute therewith a two-point-support, a track-chain adapted to flexibly conform to uneven ground trained around the wheels, track-rollers travelable upon the ground-run, rollers adapted to support the upper-run and a spring interposed between the rollers and track-rollers adapted to effect resilient pressure upon the ground-run and upper-run.

21. In a tractor, a driver wheel and a driven wheel with a track-chain trainable around them and a flanged-wheel track-chain guard its periphery adjacent to the ground-run track surface having its axis so disposed that if prolonged it would pass across the vertical plane and within the circumference of one of the first mentioned wheels.

22. In a convertible tractor, a load-supporting driver wheel and a driven support-wheel with a track-chain trained around them, track-rollers travelable upon the ground-run intermediate of the driver and driven wheels, and an axle for the support-wheel pivoted on a vertical axis.

23. In a convertible tractor, a driver wheel and a driven support wheel with a track-chain trained around them, track-wheels travelable upon the ground run intermediate the driver and driven wheels, an axle for the support-wheel one of its ends pivoted on a vertical axis and a support for the other end with means adapted to lock the axle at will in fixed position.

24. A convertible tractor comprising a frame, motor means thereon, cushion-tire support-wheels journaled on the frame, a track-chain trained around the wheels, means adapted to detachably position track-rollers travelable upon the ground-run and locking means on the frame to secure at will the track-rollers in operative relation.

25. A convertible tractor comprising a frame, motor means thereon, cushion-tire support-wheels journaled on the frame, a track-chain trained around the wheels, means adapted to detachably position spring-opposed track-rollers travelable upon the ground-run together with spring-opposed support-rollers for the upper-run and locking means on the frame to secure at will the track-rollers and support-rollers in operative relation.

26. In a track assembly for vehicles, a frame with cushion-tire support-wheels journaled thereon, a track-chain adapted to flexibly conform to uneven ground trained around the support-wheels in friction-driven circumferential contact, cushion-tire track-rollers travelable upon the ground-run, cushion-tire rollers adapted to support the upper run and means attached to the frame and depending therefrom on each side of the track adapted to maintain the operative relation between the wheels and the track chain.

27. In a tractor having a load-supporting driver-wheel and a load-supporting driven-wheel with a track-chain trained around them, track-rollers travable upon the ground-run intermediate of the driver and driven wheels, a rock-arm upon which the track-rollers are journaled the rock-arm being pivoted intermediate of its ends and between the track-rollers.

28. In a tractor having a load-supporting driver-wheel and a load-supporting driven wheel with a track-chain trained around them, a plurality of rock-arms longitudinally disposed between the said wheels, a track-wheel at each end of each rock-arm forming a plurality of pairs of track-rollers travelable upon the ground-run each rock-arm pivoted intermediate its ends and between the track-rollers to permit independent vertical arc-movement.

29. A track assembly for vehicles comprising a frame, cushion-tire support-wheels journaled thereon, a chain adapted to flexibly conform to uneven ground trained around the support-wheels with side tracks having a flat surface trackway intermediate thereof in which trackway the support-wheels are travelable and cushion-tire wheels travelable on the side tracks of the ground run longitudinally intermediate the support-wheels.

30. A track assembly for vehicles comprising a frame, cushion-tire support-wheels journaled thereon, a track-chain adapted to flexibly conform to uneven ground trained around the support-wheels having a flat surface trackway in which the support wheels are travelable and cushion-tire track-wheels travelable on a track at each side of the trackway.

31. A convertible tractor comprising motor means having a transverse power-shaft with a cushion-tire load supporting drive wheel thereon at each side of the tractor, a traction assembly on one side of the motor consisting of a longitudinal frame one of its ends pivoted adjacent to the power-shaft, a cushion-tire support-wheel journaled on the frame longitudinally spaced apart from a drive-wheel to constitute therewith a two-point-support, a track-chain trained around the wheels, cushion-tire track-wheels travelable upon the ground-run, cushion-tire rollers adapted to support the upper-run, a similar track assembly on the other side of the motor and means adapted to support the front end of the motor and to permit independent vertical arc movement of each traction assembly.

32. A convertible tractor comprising motor means having a transverse power-shaft with a cushion-tire load-supporting drive-wheel thereon at each side of the tractor, a traction assembly on one side of the motor consisting of a longitudinal frame one of its ends pivoted adjacent to the power-shaft, a cushion-tire support-wheel journaled on the frame longitudinally spaced apart from a drive-wheel to constitute therewith a two-point-support, a track-chain trained around the wheels, cushion-tire track-wheels travelable upon the ground-run, cushion-tire wheels adapted to support the upper-run, a similar traction assembly on the other side of the motor and resilient means adapted to support the front end of the motor and to permit independent vertical arc movement of each traction assembly.

WILLIAM H. SMYTH.